United States Patent
Chan et al.

(10) Patent No.: US 11,099,703 B1
(45) Date of Patent: Aug. 24, 2021

(54) TOUCH SENSOR PANELS WITH SILVER NANOWIRE-BASED TOUCH ELECTRODES

(71) Applicant: Apple Inc., Cupertino, CA (US)

(72) Inventors: Isaac Wing-Tak Chan, Sunnyvale, CA (US); Chun-Hao Tung, San Jose, CA (US); Sz-Hsiao Chen, Osaka (JP); Wenqing Dai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/681,796

(22) Filed: Nov. 12, 2019

Related U.S. Application Data

(60) Provisional application No. 62/760,012, filed on Nov. 12, 2018.

(51) Int. Cl.
*G06F 3/047* (2006.01)
*G06F 3/044* (2006.01)

(52) U.S. Cl.
CPC .............. *G06F 3/047* (2013.01); *G06F 3/044* (2013.01); *G06F 2203/04104* (2013.01); *G06F 2203/04107* (2013.01)

(58) Field of Classification Search
CPC ...................... G06F 3/047; G06F 3/044; G06F 2203/04104; G06F 2203/04107
See application file for complete search history.

(56) References Cited

U.S. PATENT DOCUMENTS

| 8,917,362 | B2 | 12/2014 | Wang et al. |
| 8,957,318 | B2 | 2/2015 | Zou et al. |
| 2012/0255762 | A1 | 10/2012 | Katagiri et al. |
| 2014/0110638 | A1 | 4/2014 | Miyagishima et al. |
| 2014/0255707 | A1 | 9/2014 | Philip et al. |
| 2016/0306470 | A1* | 10/2016 | Park ........................ G06F 3/044 |
| 2016/0357079 | A1 | 12/2016 | Chen et al. |
| 2017/0329436 | A1 | 11/2017 | Choi et al. |
| 2018/0203553 | A1 | 7/2018 | Li et al. |
| 2019/0196549 | A1* | 6/2019 | Lin ........................ G06F 1/1652 |
| 2019/0391685 | A1* | 12/2019 | Chen ......................... C09J 9/02 |

FOREIGN PATENT DOCUMENTS

| WO | 2018/164734 A1 | 9/2018 |
| WO | 2018/196272 A1 | 11/2018 |

\* cited by examiner

*Primary Examiner* — Sahlu Okebato
(74) *Attorney, Agent, or Firm* — Kubota & Basol LLP

(57) ABSTRACT

A touch sensor panel can include a silver nanowire touch electrodes formed in a silver nanowire layer on the substrate. In some examples, the touch sensor panel can include one or more anticorrosion layers to protect silver nanowire layer from ionization. In some examples, the silver nanowires include electrochemically stable outer shells that protect the silver nanowires from ionization. Additionally or alternatively, the touch sensor panel can including one or more anti-static layers to protect against electrostatic discharge (ESD). Additionally or alternatively, one or more anticorrosion layers and/or one or more antistatic layers can be formed with a passivation layer therebetween. The passivation layer, one or more anticorrosion layers and/or one or more antistatic layers can then be laminated to the silver nanowire layer to prevent corrosion and/or ESD events in the silver nanowire layer during the fabrication of the touch sensor panel.

20 Claims, 9 Drawing Sheets

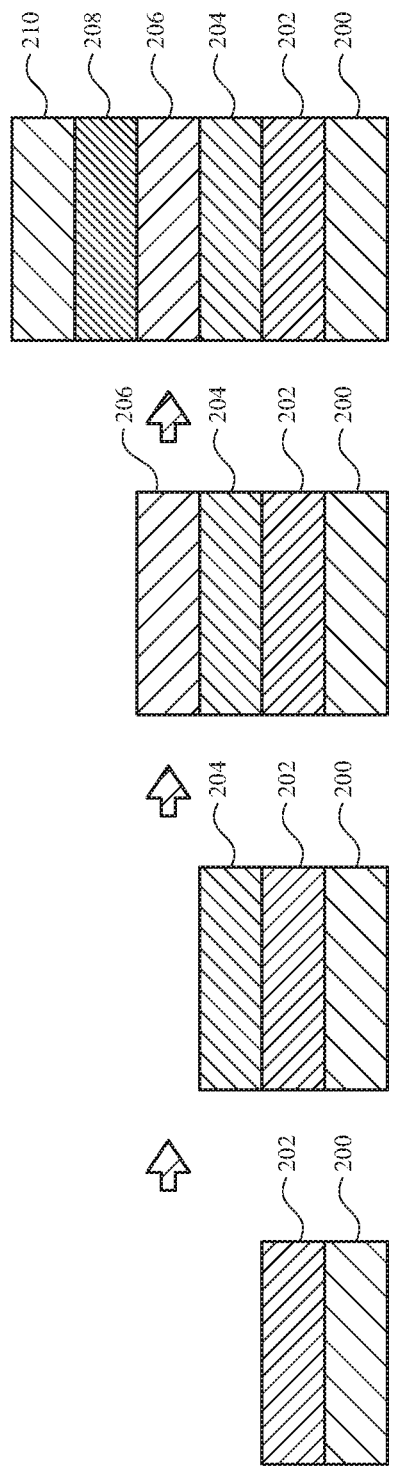

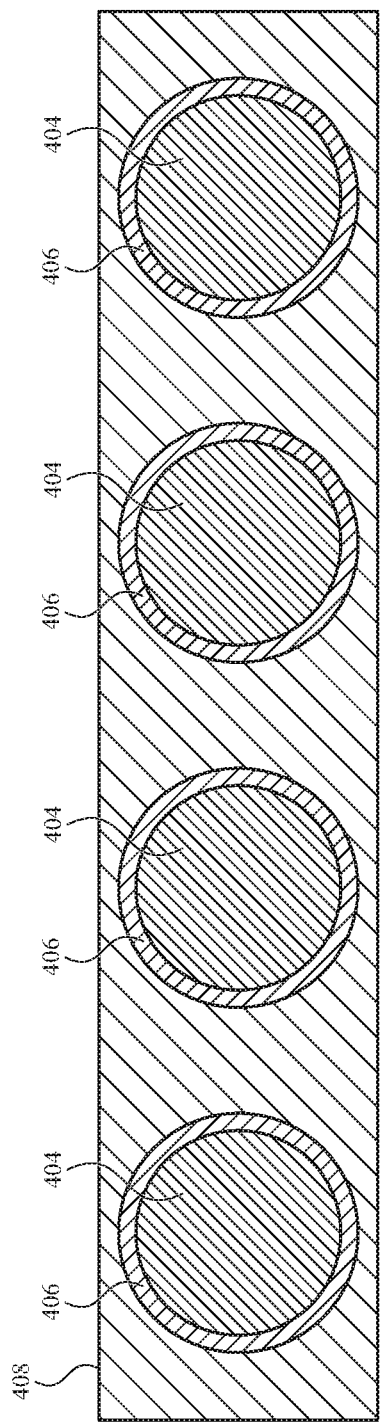

500 →

| Cover Glass 502 |
| Anti-static 504 |
| OCA 506a |
| AgNW 508a |
| Substrate 510 |
| AgNW 508b |
| OCA/Air 506b |
| Display 512 |

| Anti-static 504 |
| Cover Glass 502 |
| OCA 506a |
| AgNW 508a |
| Substrate 510 |
| AgNW 508b |
| OCA/Air 506b |
| Display 512 |

| Cover Glass 502 |
| OCA 506a |
| Anti-static 504 |
| AgNW 508a |
| Substrate 510 |
| AgNW 508b |
| OCA/Air 506b |
| Display 512 |

| Cover Glass 502 |
| Anti-static/OCA 520 |
| AgNW 508a |
| Substrate 510 |
| AgNW 508b |
| OCA/Air 506b |
| Display 512 |

| Cover Glass 502 |
| OCA 506a |
| Anti-static 504 |
| Passivation 602a |
| AgNW 508a |
| Substrate 510 |
| AgNW 508b |
| Passivation 602b |
| OCA/Air 506b |
| Display 512 |

| Cover Glass 502 |
| OCA 506a |
| Anti-static/ Passivation 606 |
| AgNW 508a |
| Substrate 510 |
| AgNW 508b |
| Passivation 602b |
| OCA/Air 506b |
| Display 512 |

FIG. 6B

TOUCH SENSOR PANELS WITH SILVER NANOWIRE-BASED TOUCH ELECTRODES

CROSS-REFERENCE TO RELATED APPLICATIONS

This application claims benefit of U.S. Provisional Application No. 62/760,012, filed Nov. 12, 2018, the disclosure of which is incorporated herein by reference.

FIELD OF THE DISCLOSURE

This relates generally to touch sensor panels, and more particularly to touch sensor panel designs that include touch electrodes formed of silver nanowire materials.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

This disclosure relates touch sensor stackups including silver nanowire (or other suitable conductors). In some examples, one or more anticorrosion layers can be used to protect silver nanowire materials used to form touch electrodes on a touch sensor panel from ionization (to reduce migration of ionic compounds that may cause corrosion of the touch electrodes). In some examples, the touch sensor panel stackups include one or more overcoat layers (e.g., on one or both sides) of the silver nanowire layer. The one or more of the overcoat layers can include anticorrosion compounds that protect the silver nanowire layer from ionization. In some examples, the touch sensor panel stackup can include a passivation layer that includes anticorrosion compounds (e.g., embedded in the passivation layer or deposited as anticorrosion layer on the passivation layer) that protect the silver nanowire layer from ionization (e.g., including protecting the sidewalls of the silver nanowire layer that may be exposed during photo-lithography). In some examples, the silver nanowire layer includes silver nanowires that include electrochemically stable (e.g., electrocatalytic activity less than a threshold) outer shells that protect the silver nanowires from ionization (e.g., in the ionic solutions that may be present during manufacture).

Additionally or alternatively, the touch sensor stackup can including one or more anti-static layers to protect against electrostatic discharge (ESD) during manufacturing or during layer use. For example, silver nanowires can be susceptible to ESD due to its nanostructure, which may nanowires with diameters less than 50 nm that may be damaged due to concentrated Joule heating during an ESD event. The one or more anti-static layers can dissipate ESD charge before the ESD charge builds up at the silver nanowire layer.

Additionally or alternatively, one or more anticorrosion layers and/or one or more antistatic layers can be formed with a passivation layer therebetween in one or more processes. The passivation layer, one or more anticorrosion layers and/or one or more antistatic layers can then be laminated to the silver nanowire layer to prevent corrosion and/or ESD events in the silver nanowire layer during the fabrication of the stackup. In some examples, the passivation layer (and including the antistatic and/or anticorrosion layers) can have photosensitivity characteristics to allow for photo-patterning of the silver nanowire touch electrodes.

BRIEF DESCRIPTION OF THE DRAWINGS

FIGS. 2A-2D illustrate an exemplary AgNW touch sensor panel structure that includes top and bottom overcoat layers that are adjacent to the AgNW layer from both sides for protecting the AgNW layer from corrosion according to examples of the disclosure.

FIG. 4 illustrates silver nanowires in the AgNW layer surrounded by an outer shell of electrochemically stable material to protect the silver nanowires from ionization according to examples of the disclosure.

FIGS. 5A-5D illustrate touch sensor panel stack-ups including one or more silver nanowire layers and an anti-static layer according to examples of the disclosure.

FIGS. 6A-6C illustrate exemplary touch sensor panel stack-ups that include silver nanowire layers, anti-static layers, and passivation layers according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This disclosure relates touch sensor stackups including silver nanowire (or other suitable conductors). In some examples, one or more anticorrosion layers can be used to protect silver nanowire materials used to form touch electrodes on a touch sensor panel from ionization (to reduce migration of ionic compounds that may cause corrosion of the touch electrodes). In some examples, the touch sensor panel stackups include one or more overcoat layers (e.g., on one or both sides) of the silver nanowire layer. The one or more of the overcoat layers can include anticorrosion compounds that protect the silver nanowire layer from ionization. In some examples, the touch sensor panel stackup can include a passivation layer that includes anticorrosion compounds (e.g., embedded in the passivation layer or deposited as anticorrosion layer on the passivation layer) that protect the silver nanowire layer from ionization (e.g., including protecting the sidewalls of the silver nanowire layer that may be exposed during photo-lithography). In some examples, the silver nanowire layer includes silver nanowires that include electrochemically stable (e.g., electrocatalytic activity less than a threshold) outer shells that protect the silver nanowires from ionization (e.g., in the ionic solutions that may be present during manufacture).

Additionally or alternatively, the touch sensor stackup can including one or more anti-static layers to protect against electrostatic discharge (ESD) during manufacturing or during layer use. For example, silver nanowires can be susceptible to ESD due to its nanostructure, which may nanowires with diameters less than 50 nm that may be damaged due to concentrated Joule heating during an ESD event. The one or more anti-static layers can dissipate ESD charge before the ESD charge builds up at the silver nanowire layer.

Additionally or alternatively, one or more anticorrosion layers and/or one or more antistatic layers can be formed with a passivation layer therebetween in one or more processes. The passivation layer, one or more anticorrosion layers and/or one or more antistatic layers can then be laminated to the silver nanowire layer to prevent corrosion and/or ESD events in the silver nanowire layer during the fabrication of the stackup. In some examples, the passivation layer (and including the antistatic and/or anticorrosion layers) can have photosensitivity characteristics to allow for photo-patterning of the silver nanowire touch electrodes.

Figure 1A:
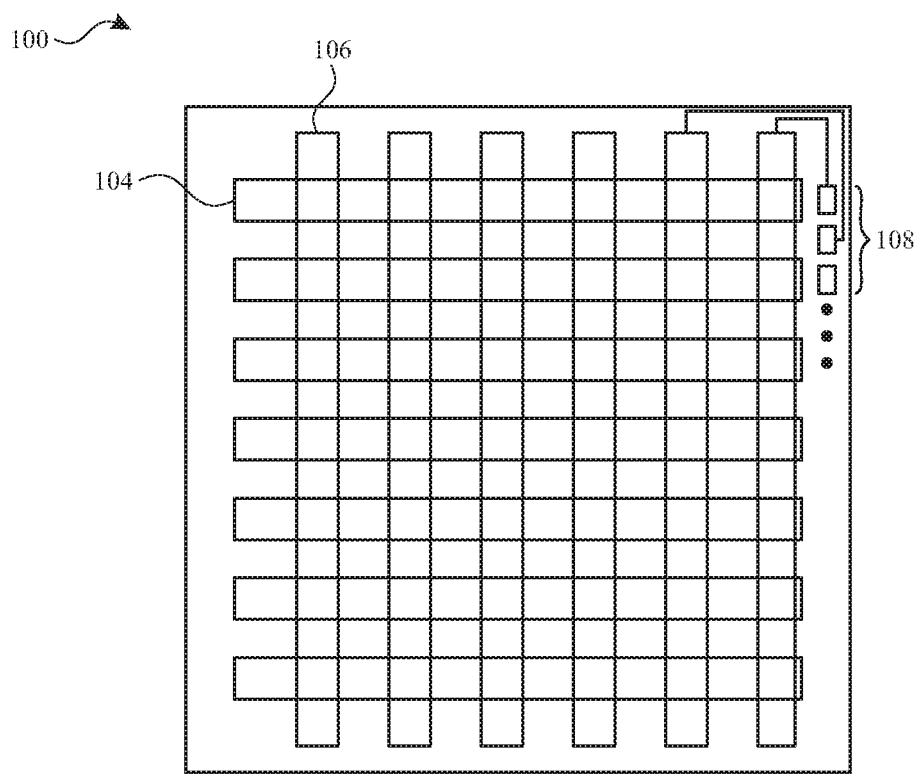
FIGS. 1A-1B illustrate touch sensor panels including touch electrodes according to examples of the disclosure.
Figure 1B:
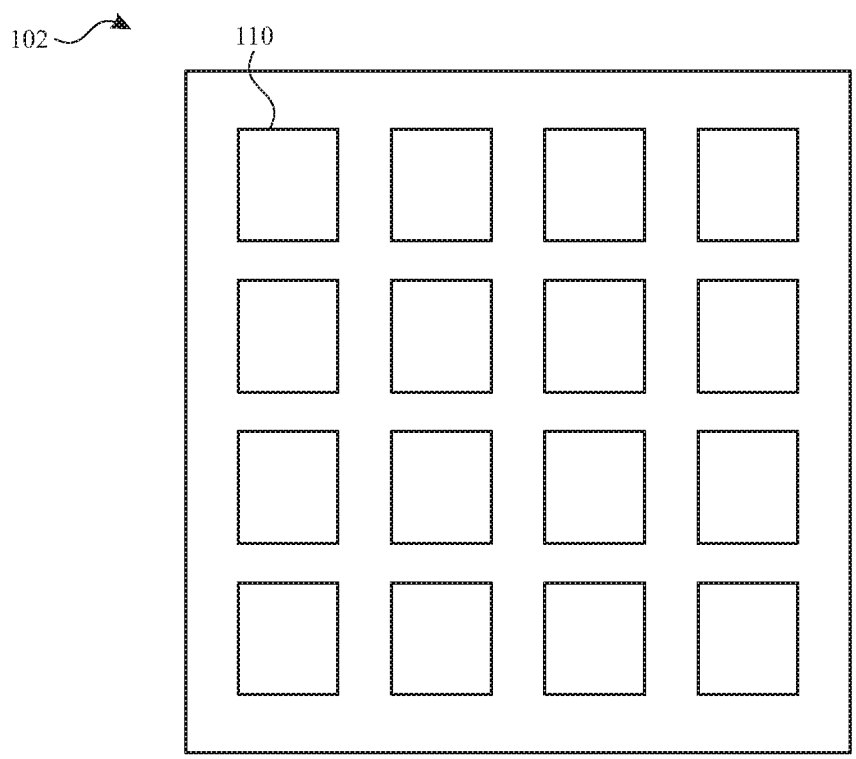

FIGS. 1A-1B illustrate touch sensor panels including touch electrodes according to examples of the disclosure. FIG. 1A illustrates touch sensor panel 100 with a plurality of row electrodes 104 and a plurality of column electrodes 106. In some examples, touch sensor panel 100 can include one or more touch electrodes disposed as columns that form column electrodes 106 (e.g., single contiguous electrodes, or noncontiguous electrodes electrically coupled together using electrical bridges), and one or more touch electrodes disposed as rows that form row electrodes 104 (e.g., single contiguous electrodes, or noncontiguous electrodes electrically coupled together using electrical bridges). In some examples, column electrodes 106 can be sense lines, and row electrodes 104 can be drive lines, though in some examples, column electrodes 106 can be drive lines and row electrodes 104 can be sense lines. The electrodes 104 and 106 can be on the same or different material layers on touch sensor panel 100, and the column electrodes 106 and the row electrodes 104 can intersect with each other while remaining electrically isolated from each other, as illustrated in FIG. 1A. In some examples, touch sensor panel 100 can sense the self-capacitance of electrodes 104 and 106 to detect touch and/or proximity activity on touch sensor panel 100, and in some examples, touch sensor panel 100 can sense the mutual capacitance between electrodes 104 and 106 to detect touch and/or proximity activity on touch sensor panel 100.

Touch sensor panel 100 can also include bond pads that can facilitate electrical connections between row electrodes 104 and/or column electrodes 106 and other circuitry (e.g., touch sensing circuitry, driving circuitry, etc.). For example, touch sensor panel 100 can include bond pads 108 in the border region of touch sensor panel 100 that can be electrically connected to column electrodes 106 via routing traces. Touch sensor panel 100 can similarly include other bond pads in the border region of touch sensor panel 100 for electrically connecting to other column electrodes 106 and row electrodes 104 on touch sensor panel. It is understood that in some examples, bond pads 108 can be outside of the border region, such as on a tail that is bent behind the touch sensor panel to other circuitry (e.g., to a touch controller including driving and/or sensing circuitry).

Although FIG. 1A illustrates a touch sensor panel 100 in a row-column configuration, in some examples, a touch sensor panel can have a pixelated configuration. FIG. 1B illustrates touch sensor panel 102 with touch electrodes 110 arranged in a pixelated touch electrode configuration according to examples of the disclosure. Specifically, touch sensor panel 102 can include a plurality of individual touch electrodes 110, each touch electrode identifying or representing a unique location on the touch sensor panel at which touch or proximity (i.e., a touch or proximity event) is to be sensed, and each touch electrode being electrically isolated from the other touch electrodes in the touch sensor panel. Touch electrodes 110 can be on the same or different material layers on touch screen 102. In some examples, touch electrodes 110 can be substantially square-shaped (or rectangular-shaped) and distributed across touch sensor panel 100 in a matrix. For example, each rows of touch electrodes can include a plurality of touch electrodes, and each columns of touch electrodes can include a plurality of touch electrodes.

In some examples, touch sensor panels 100 or 102 can be based on self-capacitance. A self-capacitance based touch system can include a matrix of small, individual plates of conductive material or an array of conductive lines that can be referred to as touch electrodes (e.g., row electrodes 104 and column 106 electrodes as shown in FIG. 1A, or touch electrodes 110 as shown in FIG. 1B). In some examples, each touch electrode can be individually coupled to sense circuitry via individual traces—thus, each touch electrode can be individually addressable by the touch sensing system. During operation, a touch electrode can be stimulated with an alternating current (AC) waveform, and the self-capacitance to ground of the touch electrode can be measured. As an object approaches the touch electrode, the self-capacitance to ground of the touch electrode can change (e.g., increase). This change in the self-capacitance of the touch electrode can be detected and measured by the touch sensing system to determine the positions of multiple objects when they touch, or come in proximity to, the touch sensor panel. In some examples, the electrodes of a self-capacitance based touch system can be formed from rows and columns of conductive material (e.g., as shown in FIG. 1A), and changes in the self-capacitance to ground of the row electrodes and column electrodes can be detected. In some examples, the electrodes of a self-capacitance based touch system can be formed of pixelated touch electrodes (e.g., as shown in FIG. 1B), and changes in the self-capacitance to ground of the touch electrodes can be detected. In some examples, a touch sensor panel can be multi-touch, single touch, projection scan, full-imaging multi-touch, capacitive touch, etc.

In some examples, touch sensor panels 100 and 102 can be based on mutual capacitance. A mutual capacitance based touch system can include drive and sense lines (e.g., row electrodes 104 and column electrodes 106, respectively) that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In a similar manner a mutual capacitance based touch system can include touch electrodes (e.g., touch electrodes 110) that may be adjacent to each other on the same layer (e.g., as illustrated in FIG. 1B). The adjacent locations between a touch electrode in a drive configuration (e.g., coupled to drive circuitry) and a touch electrode in a sense configuration (e.g., coupled to sense circuitry) can be referred to as touch nodes. During operation, the touch electrode in a drive configuration can be stimulated with an AC waveform and the mutual capacitance of the touch node can be measured by a touch electrode in a sense configuration. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen.

In some examples, touch sensor panels 100 or 102 can be implemented with an opaque touch-sensing surface. In some examples, touch sensor panels 100 or 102 can overlay or be an integrated with a display to form a touch screen. In some integrated touch screens, touch sensing circuit elements of the touch sensing system can be integrated into the display pixel stackups of a display. The circuit elements in the touch screen can include, for example, elements that can exist in LCD or other displays (e.g., light emitting diode (LED) display or organic light emitting diode (OLED), etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

In some examples, it can be desirable to use silver nanowires (AgNW) (or more generally silver nano materials) to form the touch electrodes of the touch sensor panel due to various electrical, mechanical, structural, optical, etc. characteristics of AgNW that can be beneficial for a particular application of a touch sensor panel. However, AgNW nanowire or other nanomaterials can be susceptible to Ag corrosion, ionization and/or migration, which can result in structural, optical, mechanical and/or electrical degradation of the touch electrodes over time. Some examples of the disclosure provide for various manners of protecting AgNW or other silver nanomaterials used in touch sensor panels from the above corrosion (e.g., providing Ag migration/corrosion resistance). Additionally or alternatively, AgNW or other nanomaterials may be susceptible to electrostatic discharge (ESD) compared with other touch electrode materials (e.g., ITO) due to the electric currents being densely confined in the nanowire diameter and that flow across nanowire junctions (as compared with the electric currents being uniformly spread out in a uniform ITO material layer). Such ESD events can damage the silver nanowire due to concentrated Joule heading from the densely confined electric currents. Some examples of the disclosure provide for various manners of protecting AgNW or other silver nanomaterials used in touch sensor panels from the above ESD event (e.g., providing ESD resistance).

FIGS. 2A-2D illustrate an exemplary AgNW touch sensor panel structure that includes top and bottom overcoat layers that are adjacent to the AgNW layer from both sides for protecting the AgNW layer from corrosion according to examples of the disclosure. The structure can include a polyethylene terephthalate (PET) substrate 200 (or any other suitable substrate on which to form the AgNW touch electrodes), a bottom overcoat layer 202 on top of substrate 200, a AgNW layer 204 on top of the bottom overcoat layer 202, a top overcoat layer 206 on top of the AgNW layer 204, a cushion layer 208 on top of the top overcoat layer 206, and a top PET substrate 210 (or any other suitable substrate). In some examples, the above layers can be formed one on top of the other as shown in FIGS. 2A-2D.

Bottom overcoat layer 202 can serve one or more functions. For example, bottom overcoat layer 202 can be configured to facilitate robust adhesion of AgNW layer 204 to the stackup. Bottom overcoat layer 202 can also be photo-sensitive such that it can be patterned during photolithography (e.g., as described with reference to FIGS. 3A-3D). Thus, in some examples, bottom overcoat layer 202 can include photoinitiators (e.g., i-line ultraviolet (UV) photoinitiators and/or g-line UV photoinitiators). In some examples, bottom overcoat layer 202 can include i-line UV photoinitiators for top side lithography (e.g., lithography with light from above the stackup), and/or g-line UV for bottom side lithography (e.g., lithography with light from below the stackup). Further, in some examples, bottom overcoat layer 202 can be configured to perform an anticorrosion function for AgNW layer 204. Specifically, bottom overcoat layer 202 can be a polymer layer that chemically passivates the AgNW layer 204 surface to prevent Ag ionization. In some examples, bottom overcoat layer 202 can be hydrophobic or chemically inert to $H_2O$, $OH^-$, $H^+$, and/or other ionic compounds. In some examples, bottom overcoat layer 202 can include one or more anticorrosion compounds that help prevent Ag ionization of the bottom surface of AgNW layer 204 (though in some examples, bottom overcoat layer 202 does not include such compounds).

AgNW layer 204 can be a layer of silver nanowires, such as for use as touch electrodes. Like bottom overcoat layer 202, top overcoat layer 206 can also serve one or more functions. For example, top overcoat layer 206 can be configured to protect AgNW layer 204 from chemical processes that might occur during fabrication of the touch sensor panel (e.g., during photolithography, developing, etc.). Top overcoat layer 206 can also be photo-sensitive such that it can be patterned during photolithography (e.g., as described with reference to FIGS. 3A-3D). Thus, in some examples, top overcoat layer 206 can include photoinitiators (e.g., i-line UV photoinitiators and/or g-line UV photoinitiators). In some examples, top overcoat layer 206 can include i-line UV photoinitiators for top side lithography (e.g., lithography with light from above the stackup), and/or g-line UV for bottom side lithography (e.g., lithography with light from below the stackup). Further, in some examples, top overcoat layer 206 can be configured to perform an anticorrosion function for AgNW layer 204. Specifically, top overcoat layer 206 can be a polymer layer that chemically passivates the AgNW layer 204 surface to prevent Ag ionization. In some examples, top overcoat layer 206 can be hydrophobic or chemically inert to $H_2O$, $OH^-$, $H^+$, and/or other ionic compounds. In some examples, top overcoat layer 206 can include one or more anticorrosion compounds that help prevent Ag ionization of the bottom surface of AgNW layer 204 (though in some examples, top overcoat layer 206 does not include such compounds). In some examples, both bottom overcoat layer 202 and top overcoat layer 206 can include anticorrosion compounds, or only one of bottom overcoat layer 202 and top overcoat layer 206 can include such anticorrosion compounds, or neither of bottom overcoat layer 202 and top overcoat layer 206 can include such anticorrosion compounds. In some examples, the thicknesses of bottom overcoat layer 202 and top overcoat layer 206 can be less than 200 nm, less than 150 nm, or less than 100 nm.

Cushion layer 208 and top PET substrate 210 can be included in the stackup to provide for structural stability to the stackup during fabrication and/or to allow for process steps to occur in the fabrication of the touch sensor panel (e.g., acting as a carrier film for roll-to-roll lamination). In some examples, cushion layer 208 can be made of the same base material as bottom overcoat layer 202 and top overcoat layer 206, except that it can lack anticorrosion compounds (e.g., because cushion layer 208 is not in contact with AgNW layer 204, and thus need not include such compounds) and it can lack photoinitiators (e.g., because cushion layer 208 need not be patternable during lithography, and can be fully removed from the stackup during the lithography step).

Figure 3A:
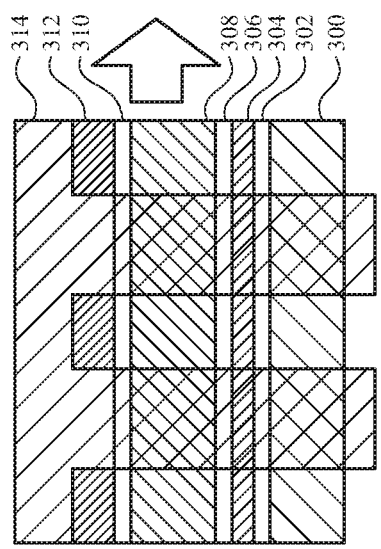
FIGS. 3A-3D illustrate an exemplary process for forming touch electrodes using the AgNW stackup of FIGS. 2A-2D according to examples of the disclosure.
Figure 3B:
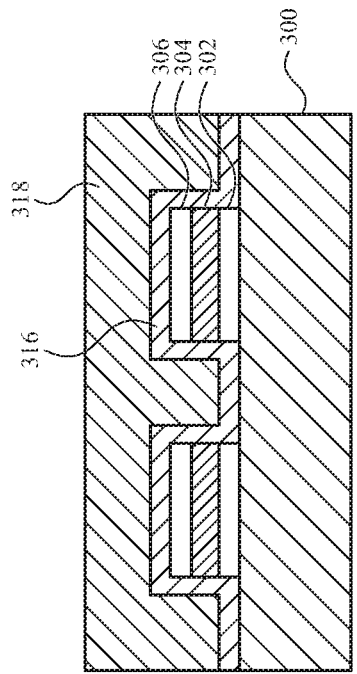
Figure 3C:
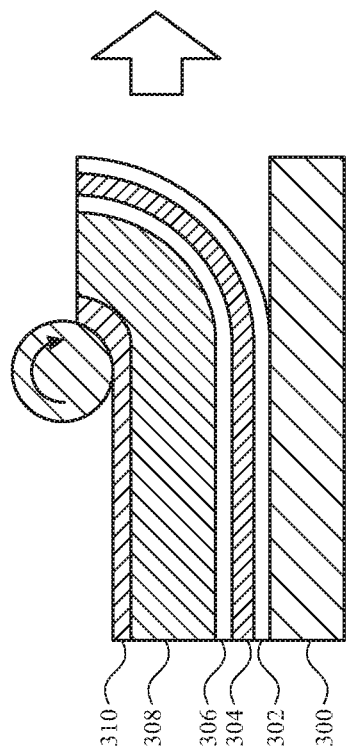

FIGS. 3A-3D illustrate an exemplary process for forming touch electrodes using the AgNW stackup of FIGS. 2A-2D according to examples of the disclosure. In FIG. 3A, a stackup of bottom overcoat layer 302, AgNW layer 304, top overcoat layer 306, cushion layer 308 and top substrate 310 can be rolled onto substrate 300. In FIG. 3B, a masking layer 312 can be formed on top of top substrate 310 to define the patterns of the touch electrodes, and light 314 (e.g., i-line UV) can be directed towards the stackup from above. Light 314 can photoactivate top overcoat layer 306 and bottom overcoat layer 302, while the other layers do not react to light 314. Subsequently, top substrate and mask 312 can be removed, and the remaining layers can be developed/removed/etched to result in patterns of top overcoat layer 306, AgNW layer 304 and bottom overcoat layer 302 formed on top of substrate 300, as shown in FIG. 3C. These patterns can form touch electrodes for the touch sensor panel.

In some examples, the sidewalls of AgNW layer 304 in FIG. 3C can be exposed to possible ionization, because the anticorrosion compounds of top and bottom overcoat layers 306 and 302 may only be in contact with the top and bottom surfaces of AgNW layer 304, and not in contact with the sidewalls of the patterned AgNW layer 304. Thus, in some examples, a passivation layer that is formed on top of the structure of FIG. 3C can include anticorrosion compounds (like in top and bottom overcoat layers 306 and 302) to protect the sidewalls of the AgNW layer 304 from ionization, such as shown in FIG. 3D.

Figure 3D:
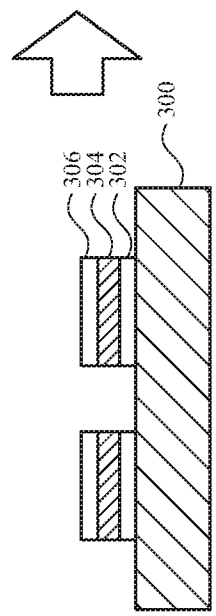

For example, in FIG. 3D, a film 316 of anticorrosion materials is formed over the patterned AgNW structures, and a passivation layer 318 is formed on top of that. The anticorrosion compounds in film 316 can be the same or different than the compounds included in top 306 and/or bottom 302 overcoat layers. As shown in FIG. 3D, film 316 can be in contact with the sidewalls of AgNW layer 304, thus protecting those sidewalls from ionization. In some examples, film 316 may not be a permanent physical layer (e.g., it may be absorbed by the AgNW layer and/or other layers, such as in the case of a wet spray anticorrosion film that can be sprayed over the AgNW structures before the deposition of the passivation layer 318), and thus may not present as a physical layer, but may be detectable with chemical analysis. In some examples, instead of being a separate layer, the anticorrosion compounds can be incorporated into passivation layer 318 (e.g., similar to top and bottom overcoat layer 306 and 302), thus eliminating the need to perform two separate steps for passivating the stackup of FIG. 3C. In some examples, no anticorrosion compounds/films are used in passivating the stackup of FIG. 3C (e.g., a passivation layer 318 is formed over the patterned AgNW structures without anticorrosion compounds in the passivation layer and without depositing an anticorrosion layer over the AgNW structures) such that the anticorrosion functions of the stackup are, instead, performed by the top and bottom overcoat layers 306 and 302.

In some examples, the above process of FIGS. 3A-3D can be repeated or performed in parallel with the same stackup (e.g., layers 302, 304, 306, 308, 310) positioned underneath substrate 300 to result in a structure of touch electrodes on both sides of substrate 300 (e.g., top and bottom of substrate 300).

Alternatively or in addition to any of the examples disclosed above, the AgNW layer can have characteristics for reducing ionization of the AgNW layer. For example, the AgNW layer can include anticorrosion compounds (e.g., anticorrosion compounds used in the top and bottom overcoat layers and/or the passivation layer). Additionally or alternatively, the silver nanowires in the AgNW layer can be surrounded by an outer shell of electrochemically stable material to protect the silver nanowires from ionization, such as shown in FIG. 4. For example, in FIG. 4, silver nanowires 404, which can be disposed in a binding material 408 for binding the silver nanowires together in the AgNW layer, can have outer shell layers 406 that are electrochemically stable (e.g., to $H_2O$, $OH^-$, $H^+$, and/or other ionic compounds), such as Pt, Pd, Ni, etc. In some examples, shell layers 406 can be formed on silver nanowires 404 by electrodeposition and/or by chemical catalysts. In this way, the AgNW layer of the touch sensor panel can be (further) protected from Ag ionization.

As described herein, in some examples, the risk of an ESD event damaging the silver nanowire layer can be mitigated by applying an anti-static layer or coating over the silver nanowire layer. In some examples, the antistatic layer can be disposed directly on the silver nanowire layer, or indirectly (e.g., with other intervening layers). The anti-static layer can be a resistive layer with high sheet resistance and can be implemented by coating, spraying, or printing resistive materials (e.g., polystyrene sulfonate (PEDOT)). The anti-static layer can, in some examples, also be transparent or substantially transparent to reduce optical impact to the stackup (e.g., for a touch screen implementation).

FIGS. 5A-5D illustrate touch sensor panel stack-ups including one or more silver nanowire layers and an anti-static layer according to examples of the disclosure. In some examples, an anti-static layer can be transparent or translucent (e.g., for touch screen applications). In some examples, an anti-static layer can be opaque (e.g., for non-display touch-sensitive surfaces). In some examples, the anti-static layer can be formed between the top substrate (cover glass or other transparent, translucent or opaque substrate) and an adhesive layer (as shown in FIG. 5A), on top of the top substrate (as shown in FIG. 5B), or between the adhesive and silver nanowire layer (as shown in FIG. 5C). In some examples, the anti-static material can be integrated with an adhesive (e.g., such as an optically clear adhesive (OCA) as shown in FIG. 5D) or with another layer (e.g., a substrate or passivation layer).

FIG. 5A illustrates an exemplary touch sensor panel stack-up 500 including one or more silver nanowire layers 508a and 508b and an anti-static layer 504 according to examples of the disclosure. In some examples, the touch sensor panel stack-up 500 includes a cover glass 502, an anti-static layer 504, a first adhesive layer 506a, a first silver nanowire layer 508a, a substrate 510, a second silver nanowire layer 508b, a second adhesive layer 506b, and a display 512.

In some examples, the substrate 510 can be a flexible or rigid material that provides support to one or more other layers in the stack-up 500 at one or more points in time during the manufacturing process and/or once the touch sensor panel is complete. In situations where the touch sensor panel is part of a touch screen (e.g., integrated with or overlaid on a display 512), the substrate 510 can include a transparent or substantially transparent material. In situations where the touch sensor panel is not part of a touch screen (e.g., the touch sensor panel is implemented with an opaque touch-sensitive surface, such as a trackpad), the substrate 510 can include an opaque material. In some examples, the substrate 510 is non-conductive and can electrically isolate one or more silver nanowire layers 508a and 508b from each other and/or from other electrical components in the stack-up. Although FIG. 5A illustrates substrate 510 as a single layer, in some examples, the substrate 510 is formed from multiple substrate layers joined together by an adhesive.

In some examples, the first silver nanowire layer 508a can be located on a first side (e.g., the top side) of substrate 510. In some examples (e.g., in a double-sided touch sensor panel implementation), the touch sensor panel stackup 500 can also include a second silver nanowire layer 508b on the second side (e.g., the bottom side) of the substrate 510, though in other examples, the second silver nanowire layer 508b is omitted (e.g., in a single-sided touch sensor panel implementation). The silver nanowire layers 508a and 508b can be the same as other silver nanowire layers described herein. For example, the silver nanowire layers 508a and 508b can include a plurality of touch electrodes formed from silver nanomaterials that can be used to sense objects proximate to and/or touching the touch sensor panel.

The touch sensor panel stackup 500 can further include a cover glass 502. In some examples, the cover glass 502 can be formed from a material other than glass. In some examples where the touch sensor panel is incorporated into or overlaid with a display 512 (e.g., the touch sensor panel is part of a touch screen), the cover glass 502 can include a transparent material such as glass, plastic, or any other suitable material that protects the rest of the stack up from damage. In some examples where the touch sensor panel is not incorporated into or overlaid on a display 512 (e.g., the touch sensor panel is implemented as part of a trackpad or other opaque touch-sensitive surface), the cover glass 502 can include opaque materials such as glass, plastic, metal, and the like.

As described above, in some examples, the touch sensor panel stackup 500 can be included in a touch screen that has a display 512. In some examples, one or more touch sensing components can be integrated with one or more display components (e.g., dual-purpose components such as electrodes, gate lines, etc.) or one or more touch sensing components can be overlaid on the one or more display components (e.g., overlaying a transparent touch sensor panel over a display). Display 512 can include display pixels configured to display one or more images on an electronic device, for example. In some examples, the touch sensor panel is not integrated with or overlaid on a display. For example, the touch sensor panel can be included in a trackpad or other non-display touch sensing input device. Thus, in some examples, display 512 is omitted from touch sensor panel stack-up 500.

In some examples, the touch sensor panel stack-up 500 can include two or more layers joined together by adhesive layers 506a and 506b. In some examples, such as in touch screen examples including a display 512, the adhesive layers 506a and 506b can include an optically clear adhesive material that does not or substantially does not interfere with visibility of display 512. In some examples, such as in non-touch screen examples that do not include a display 512, the adhesive layers 506a and 506b can include opaque adhesives in addition or as an alternative to optically clear adhesive materials. In some examples, the second silver nanowire layer 508b and display 512 can be joined by adhesive layer 506b. In some examples, the second adhesive layer 506b can optionally include an air gap in some examples, or can be omitted for an air gap over display 512. For example, the silver nanowire layer 508b and the display 512 may not completely make contact and an air gap can be included therebetween. In some examples, the first silver nanowire layer 508a and the antistatic layer 504 can be joined together by adhesive layer 506a. Thus, in some examples, the anti-static layer 504 can be located between an adhesive layer 506a and the cover glass 502.

FIG. 5B illustrates an exemplary touch sensor panel stack-up 514 including one or more silver nanowire layers 508a and 508b and an anti-static layer 504 according to examples of the disclosure. In some examples, the touch sensor panel stack-up 500 includes a cover glass 502, an anti-static layer 504, a first adhesive layer 506a, a first silver nanowire layer 508a, a substrate 510, a second silver nanowire layer 508b, a second adhesive layer 506b, and a display 512. The components of stack-up 514 can be the same as or similar to the components of stack-up 500 described above with reference to FIG. 5A, but the arrangement of some of the components can be different in some examples. For example, the anti-static layer 504 can be located on top of the cover glass 502 in stack-up 500 (e.g., the cover glass 502 can be between the anti-static layer 504 and one or more other layers of the stackup, such as the adhesive layer 506a).

FIG. 5C illustrates an exemplary touch sensor panel stack-up 516 including one or more silver nanowire layers 508a and 508b and an anti-static layer 504 according to examples of the disclosure. In some examples, the touch sensor panel stack-up 500 includes a cover glass 502, an anti-static layer 504, a first adhesive layer 506a, a first silver nanowire layer 508a, a substrate 510, a second silver nanowire layer 508b, a second adhesive layer 506b, and a display 512. The components of stack-up 516 can be the same as or similar to the components of stack-ups 500 and 514 described above with reference to FIGS. 5A-5B, but the arrangement of some of the components can be different in some examples. For example, the anti-static layer 504 can be located between the adhesive layer 506a and the first silver nanowire layer 508a in stack-up 516.

FIG. 5D illustrates an exemplary touch sensor panel stack-up 516 including one or more silver nanowire layers 508a and 508b and an anti-static adhesive layer 520 according to examples of the disclosure. In some examples, the touch sensor panel stack-up 500 includes a cover glass 502, an anti-static adhesive layer 520, a first silver nanowire layer 508a, a substrate 510, a second silver nanowire layer 508b, a second adhesive layer 506b, and a display 512. The components of stack-up 518 can be the same as or similar to the components of stack-ups 500, 514, and 516 described above with reference to FIGS. 5A-5C, except stack up 518 can include an anti-static adhesive layer 520 (e.g., an adhesive layer including anti-static compounds) between the first silver nanowire layer 508a and the cover glass 502 instead of including an anti-static layer 504 that is separate from the first adhesive layer 506a.

Figure 6C:
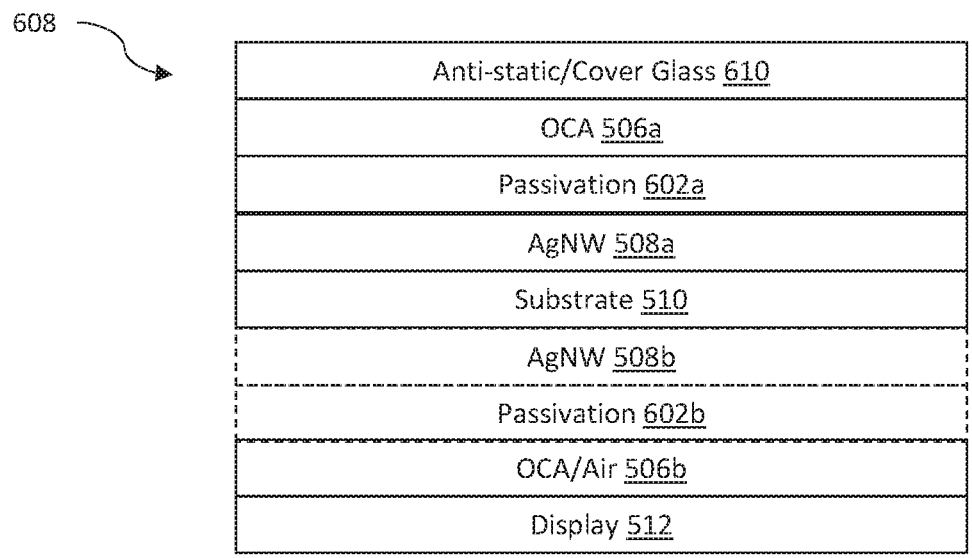

FIGS. 6A-6C illustrate exemplary touch sensor panel stack-ups that include silver nanowire layers, anti-static layers, and passivation layers according to some examples of the disclosure. In some examples, passivation layers can provide structural support for one or more stack-up layers and/or protection from moisture damage to the silver nanowire layers in the stackup. As will be described in more detail below, the passivation layers can be dedicated layers in the stack-up (e.g., as shown in FIGS. 6A and 6C) or incorporated with an anti-static layer (e.g., as shown in FIG. 6B), for example.

FIG. 6A illustrates an exemplary touch sensor panel stack-up 600 that includes silver nanowire layers 508a and 508b, an anti-static layer 504, and passivation layers 602a and 602b according to some examples of the disclosure. The stack-up 600 can include cover glass 502, adhesive layers 506a and 506b, anti-static layer 504, silver nanowire layers 508a and 508b, substrate 510, and display 512 described above with reference to FIGS. 5A-5D, for example. In some examples, stack-up 600 can further include a first passivation layer 602a located on a first (e.g., top) side of the first silver nanowire layer 508a. For example, the first passivation layer 602a can be located between the first silver nanowire layer 508a and the anti-static layer 504. In some examples, stack-up 600 can further include a second passivation layer 602b on a second (e.g., bottom) side of the second silver nanowire layer 508b. For example, the second passivation layer 602b can be located between the second silver nanowire layer 508b and the second adhesive layer 506b.

FIG. 6B illustrates an exemplary touch sensor panel stack-up 604 that includes silver nanowire layers 508a and 508b, an anti-static passivation layer 606, and passivation layer 602b according to some examples of the disclosure. The stack-up 600 can include cover glass 502, adhesive layers 506a and 506b, silver nanowire layers 508a and 508b, substrate 510, and display 512 described above with reference to FIGS. 5A-6A and second passivation layer 602b described with reference to FIG. 6A, for example. In some examples, stack-up 600 can further include an anti-static passivation layer 606 that provides the structural support and/or protection from moisture of a passivation layer (e.g., passivation layer 602a or 602b) and has anti-static properties similar to anti-static layer 504. The anti-static passivation layer 606 can be located between the first adhesive layer 506a and the first silver nanowire layer 508a.

FIG. 6C illustrates an exemplary touch sensor panel stack-up 604 that includes silver nanowire layers 508a and 508b, an anti-static cover glass 610, and passivation layers 602a and 602bb according to some examples of the disclosure. The stack-up 600 can include adhesive layers 506a and 506b, silver nanowire layers 508a and 508b, substrate 510, and display 512 described above with reference to FIGS. 5A-6B, first passivation layer 602a described with reference to FIG. 6A, and second passivation layer 602b described with reference to FIGS. 6A-6B, for example. In some examples, stack-up 600 can further include an anti-static cover glass 610. The cover glass 610 can include one or more of the materials of cover glass 502 described above and anti-static materials.

Figure 7:
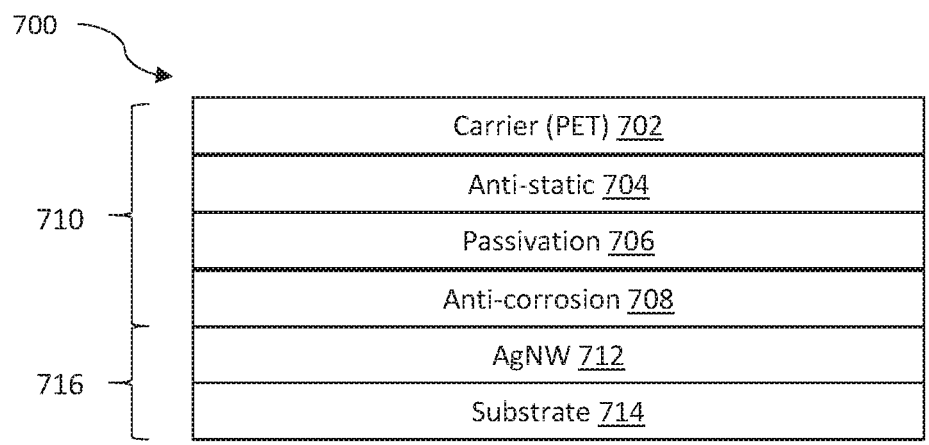
FIG. 7 illustrates an exemplary touch sensor panel stack-up including an antistatic layer 704 and an anticorrosion layer according to examples of the disclosure.

In some examples, a touch sensor panel stack up can include both the anticorrosion and the antistatic features described herein. For example, FIG. 7 illustrates a touch sensor panel stack-up 700 including an antistatic layer 704 and an anticorrosion layer 708 according to examples of the disclosure. Touch sensor panel stack-up 700 includes a silver nanowire touch sensor panel 716 including a silver nanowire layer 712 formed on substrate 714 (e.g., PET or other suitable material). Touch sensor panel stack-up 700 also including a multi-layered protective film 710 including an antistatic layer 704, a passivation layer 706 and an anticorrosion layer 708. As described herein, the layers of protective film 710 can be formed on a carrier 702.

Antistatic layer 704 can correspond to an antistatic material (e.g., PEDOT or other suitable material with high sheet resistance), and can provide protection against ESD events during manufacture or later use by an end user. Passivation layer 706 can correspond to a passivating material that can provide physical protection and moisture resistance for the silver nanowire touch electrodes (e.g., in a similar manner to passivation layer 318). Anticorrosion layer 708 can include one or more anticorrosion compounds that can prevent or otherwise reduce Ag ionization (e.g., as described with respect to bottom overcoat layer 302, top overcoat layer 306 or film 316).

In some examples, anticorrosion layer 708 may be incorporated proximate to the AgNW touch electrodes (e.g., as described with respect to FIG. 3A), passivation layer 706 (e.g., an organic passivation layer) including antistatic materials can be disposed on top of AgNW touch electrodes (and over anticorrosion layer 708) for physical protection, moisture resistance and antistatic protection (e.g., the passivation layer can include photoinitiators that can be photo-patterned. In some examples, fabricating antistatic layer 704, passivation layer 706 and anticorrosion layer 708 in this manner (including antistatic materials in the passivation layer, as illustrated in FIG. 6B, for example)) can result in short the silver nanowire touch electrodes due to migration of the antistatic material (e.g., metal nanoparticles or other suitable materials) in the wet passivation material (which may be wet coated or sprayed) or can result in decreased photosensitivity of the passivation layer due to embedded antistatic materials, which may impact the reliability of photo-patterning onto silver nanowire touch sensor panel 716.

In some examples, antistatic layer 704, passivation layer 706 (e.g., a photosensitive organic passivation layer) and anticorrosion layer 708 can be formed on a carrier 702 in multiple steps to form a dry multi-layered protective film 710. In some examples, the antistatic material can be wet coated, sprayed or printed on a carrier 702 (e.g., a flexible substrate, such as PET or other suitable substrate materials) and subsequently dried. Then, passivation layer 706 can be wet coat, sprayed or printed on antistatic layer 704, and subsequently dried. Then, anticorrosion layer 708 can be wet coat, sprayed or printed on passivation layer 706, and subsequently dried. This photosensitive, dry multi-layered protective film can then be laminated (with or without an intermediate adhesive) onto silver nanowire touch sensor panel 716 (e.g., in a roll-to-roll process or other suitable process). In some examples, the lamination can be an elevated temperature roller lamination (e.g., at a temperature between 75-100° C.). In some examples, the lamination can be performed under vacuum conditions and/or subjected to an autoclave processing step (applying elevated temperature and pressure) to reduce the potential for the formation of lamination bubbles. The dry multi-layered protective film 710 can then be exposed to light (e.g., in the ultraviolent or other suitable wavelength range) to pattern the touch sensor panel as defined by a photomask (e.g., in a similar manner as discussed above with respect to FIG. 3B), and subsequently followed by solvent development, drying and/or thermal annealing.

In some examples, carrier 702 can be removed (e.g., after laminating the protective layers of the multi-layered protective film 710 to silver nanowire touch sensor panel 716, or later in the manufacturing process. In some examples, touch sensor panel stack-up 700 (with or without carrier 702 can be integrated with additional layers such as a display (e.g., laminated with an OCA to bottom side of substrate 714) and/or with a top surface (e.g., a cover glass or opaque surface laminated with an OCA or other adhesive to carrier 702 or to anti-static layer 704).

It should be understood that touch sensor panel stackup 700 is one example, stackup but that different stackups are possible, including more, fewer or different layers in the same or different order. For example, silver nanowire touch sensor panel 716 can be formed as described in FIGS. 3A-3D and multi-layered protective film 710 can be disposed on the passivation layer 318. Additionally, although stack-up 700 shows a single silver nanowire layer (e.g., corresponding to a single-sided touch sensor panel), that stackup 700 can be modified to include a second silver nanowire layer on the opposite side of substrate 714 (e.g., in a similar manner as illustrated in FIGS. 5A-6C).

Figure 8:
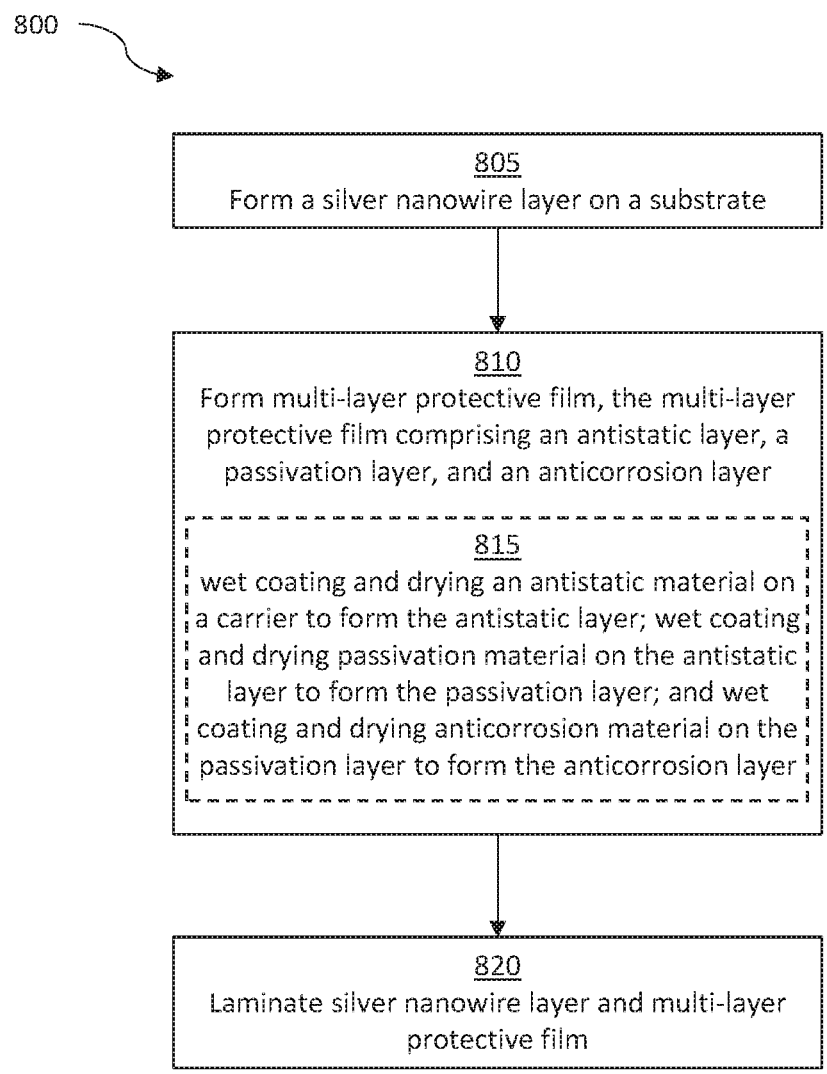
FIG. 8 illustrates a process for forming a touch sensor panel according to examples of the disclosure.

FIG. 8 illustrates a process 800 for forming a touch sensor panel (e.g., corresponding to touch sensor panel stack up 700) according to examples of the disclosure. At 805, silver nanowire layer can be formed on a substrate (e.g., corresponding to silver nanowire touch sensor panel 716). At 810, a multi-layer protective film can be formed (e.g., corresponding to multi-layered protective film 710). The multi-layer protective film comprising an antistatic layer (e.g., corresponding to antistatic layer 704), a passivation layer (e.g., corresponding to passivation layer 706), and an anticorrosion layer (e.g., corresponding to anticorrosion layer 708). In some examples, the multi-layer protective film can be formed using a sequence of wet coating (or spraying or printing) and drying. For example, the antistatic layer can be formed by wet coating and drying an antistatic material on a substrate (e.g., corresponding to carrier 702), the passivation layer can be formed by wet coating and drying passivation material on the antistatic layer, and the anticorrosion layer can be formed by wet coating and drying anticorrosion material on the passivation layer (815). At 820, the touch sensor panel can be formed by laminating the silver nanowire layer to the dry multi-layer protective film. Using an antistatic, anticorrosive and photo-patternable dry film can reduce the occurrence of ionization/corrosion and/or ESD events as described herein.

Therefore, according to the above, examples of the disclosure are directed to touch sensor panel stackups including one or more silver nanowire layers and various manners of protecting AgNW layers of a touch sensor panel from ionization and/or ESD event.

Therefore, according to the above, some examples of the disclosure are directed to a touch sensor panel comprising: a substrate; a silver nanowire layer on the substrate that forms one or more touch electrodes on the touch sensor panel, wherein the silver nanowire layer includes a first side and a second side, opposite the first side; a first overcoat layer disposed on and in contact with the first side of the silver nanowire layer; and a second overcoat layer disposed on and in contact with the second side of the silver nanowire layer, wherein at least one of the first overcoat layer and the second overcoat layer includes one or more anticorrosion compounds configured to protect the silver nanowire layer from ionization. Additionally or alternatively to one or more of the examples above, in some examples, the touch sensor panel further comprises: a passivation layer formed on the first overcoat layer, the second overcoat layer and the silver nanowire layer, the passivation layer including one or more anticorrosion compounds configured to protect one or more sidewalls of the silver nanowire layer from ionization. Additionally or alternatively to one or more of the examples above, in some examples, the silver nanowire layer includes silver nanowires that have electrochemically stable outer shells. Additionally or alternatively to one or more of the examples above, in some examples, the touch sensor panel further comprises: an anticorrosion layer deposited on the first overcoat layer, the second overcoat layer and the silver nanowire layer, the anticorrosion layer including one or more anticorrosion compounds configured to protect one or more sidewalls of the silver nanowire layer from ionization; and a passivation layer formed over the anticorrosion layer. Additionally or alternatively to one or more of the examples above, in some examples, the touch sensor panel further comprises: a passivation layer formed on the first overcoat layer, the second overcoat layer and the silver nanowire layer, without an intervening anticorrosion layer. Additionally or alternatively to one or more of the examples above, in some examples, the touch sensor panel further comprises: a passivation layer formed on the first overcoat layer, the second overcoat layer and the silver nanowire layer, wherein at least a portion of the silver nanowire layer includes anticorrosion compounds that were absorbed by the silver nanowire layer from an anticorrosion film that was deposited on the first overcoat layer, the second overcoat layer and the silver nanowire layer before the passivation layer was formed on the first overcoat layer, the second overcoat layer and the silver nanowire layer.

Some examples of the disclosure are directed to a touch sensor panel. The touch sensor panel can comprise: a substrate; a silver nanowire layer disposed on the substrate; and a multi-layer protective film disposed on the silver nanowire layer. One or more touch electrodes of the touch sensor panel are formed from silver nanowires in the silver nanowire layer. The multi-layer protective film can comprise an antistatic layer, a passivation layer, and an anticorrosion layer. Additionally or alternatively to one or more of the examples above, in some examples, the passivation layer can be disposed between the antistatic layer and the anticorrosion layer. Additionally or alternatively to one or more of the examples above, in some examples, the passivation layer can be an organic passivation layer. Additionally or alternatively to one or more of the examples above, in some examples, the passivation layer can include photoinitiators. Additionally or alternatively to one or more of the examples above, in some examples, the multi-layer protective film can be photo-patternable. Additionally or alternatively to one or more of the examples above, in some examples, the multi-layer protective film can formed by wet coating and drying an antistatic material on a carrier to form the antistatic layer, by wet coating and drying passivation material on the antistatic layer to form the passivation layer, and by wet coating and drying anticorrosion material on the passivation layer to form the anticorrosion layer. Additionally or alternatively to one or more of the examples above, in some examples, the multi-layer protective film can be coupled to the silver nanowire layer such that the anticorrosion layer is closer to the silver nanowire layer than the passivation layer or the anticorrosion layer. Additionally or alternatively to one or more of the examples above, in some examples, the multi-layer protective film can be coupled to the silver nanowire layer such that the antistatic layer is further from the silver nanowire layer than the passivation layer or the antistatic layer. Additionally or alternatively to one or more of the examples above, in some examples, the silver nanowire layer can comprise silver nanowires with electrochemically stable outer shells. Additionally or alternatively to one or more of the examples above, in some examples, the touch sensor panel can further comprise one or more overcoat layers comprising anticorrosion compounds disposed on and in contact with the silver nanowire layer.

Some examples of the disclosure are directed to a method of forming a touch sensor panel. The method can comprise: forming a silver nanowire layer on a substrate; forming a multi-layer protective film, the multi-layer protective film comprising an antistatic layer, a passivation layer, and an anticorrosion layer; and laminating the multi-layer protective film and the silver nanowire layer. Additionally or alternatively to one or more of the examples above, in some examples, the method can further comprise forming one or more touch electrodes of the touch sensor panel from silver nanowires in the silver nanowire layer (e.g., via photolithography). Additionally or alternatively to one or more of the examples above, in some examples, forming the multi-layer protective film can comprise: wet coating and drying an antistatic material on a carrier to form the antistatic layer; wet coating and drying passivation material on the antistatic layer to form the passivation layer; and wet coating and drying anticorrosion material on the passivation layer to form the anticorrosion layer. Additionally or alternatively to one or more of the examples above, in some examples, laminating the multi-layer protective film and the silver nanowire layer can comprise lamination at an elevated temperature between 75-100° C. Additionally or alternatively to one or more of the examples above, in some examples, laminating the multi-layer protective film and the silver nanowire layer can comprise laminating the anticorrosion layer of the multi-layer protective film to the silver nanowire layer. Additionally or alternatively to one or more of the examples above, in some examples, the passivation layer can be disposed between the antistatic layer and the anticorrosion layer. Additionally or alternatively to one or more of the examples above, in some examples, the passivation layer can be an organic passivation layer. Additionally or alternatively to one or more of the examples above, in some examples, the multi-layer protective film can be photo-patternable, and the method can further comprise patterning the multi-layer protective film using a photolithography process (or other light exposure process). Additionally or alternatively to one or more of the examples above, in some examples, the antistatic layer can be further from the silver nanowire layer than the passivation layer or the antistatic layer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
    a substrate;
    a silver nanowire layer disposed on the substrate, wherein one or more touch electrodes of the touch sensor panel are formed from silver nanowires in the silver nanowire layer; and
    a multi-layer protective film disposed on the silver nanowire layer, wherein the multi-layer protective film comprising an antistatic layer, a passivation layer, and an anticorrosion layer, wherein the anticorrosion layer is distinct from and directly contacts the passivation layer and the passivation layer directly contacts the antistatic layer, and wherein the multi-layer protective film is coupled to the silver nanowire layer such that the anticorrosion layer is closer to the silver nanowire layer than the passivation layer and the antistatic layer.

2. The touch sensor panel of claim 1, wherein the passivation layer is an organic passivation layer.

3. The touch sensor panel of claim 1, wherein the passivation layer includes photoinitiators.

4. The touch sensor panel of claim 1, wherein the multi-layer protective film is photo-patternable.

5. The touch sensor panel of claim 1, wherein the multi-layer protective film is formed by wet coating and drying an antistatic material on a carrier to form the antistatic layer, by wet coating and drying passivation material on the antistatic layer to form the passivation layer, and by wet coating and drying anticorrosion material on the passivation layer to form the anticorrosion layer.

6. The touch sensor panel of claim 1, wherein the silver nanowire layer comprises silver nanowires with electrochemically stable outer shells.

7. The touch sensor panel of claim 1, further comprising:
    one or more overcoat layers comprising anticorrosion compounds disposed on and in contact with the silver nanowire layer.

8. A method of forming a touch sensor panel comprising:
    forming a silver nanowire layer on a substrate;
    forming one or more touch electrodes of the touch sensor panel from silver nanowires in the silver nanowire layer;
    forming a multi-layer protective film, wherein the multi-layer protective film comprising an antistatic layer, a passivation layer, and an anticorrosion layer; and
    laminating the multi-layer protective film and the silver nanowire layer such that the anticorrosion layer is closer to the silver nanowire layer than the passivation layer and the antistatic layer.

9. The method of claim 8, forming the multi-layer protective film comprises:
   wet coating and drying an antistatic material on a carrier to form the antistatic layer;
   wet coating and drying passivation material on the antistatic layer to form the passivation layer; and
   wet coating and drying anticorrosion material on the passivation layer to form the anticorrosion layer.

10. The method of claim 8, wherein laminating the multi-layer protective film and the silver nanowire layer comprises lamination at an elevated temperature between 75-100° C.

11. The method of claim 8, wherein laminating the multi-layer protective film and the silver nanowire layer comprises laminating the anticorrosion layer of the multi-layer protective film to the silver nanowire layer.

12. The method of claim 8, wherein the passivation layer is an organic passivation layer.

13. The method of claim 8, wherein the multi-layer protective film is photo-patternable, and the method further comprises:
   patterning the multi-layer protective film using a photolithography process.

14. The method of claim 8, wherein the antistatic layer is further from the silver nanowire layer than the passivation layer or the anticorrosion layer.

15. A touch sensor panel comprising:
   a substrate;
   a silver nanowire layer disposed on the substrate, wherein one or more touch electrodes of the touch sensor panel are formed from silver nanowires in the silver nanowire layer;
   one or more overcoat layers comprising anticorrosion compounds disposed on and in contact with the silver nanowire layer; and
   a multi-layer protective film disposed on the silver nanowire layer, wherein the multi-layer protective film comprising an antistatic layer, a passivation layer, and an anticorrosion layer, wherein the anticorrosion layer is distinct from and directly contacts the passivation layer and the passivation layer directly contacts the antistatic layer, and wherein the multi-layer protective film is coupled to the silver nanowire layer such that the anticorrosion layer is closer to the silver nanowire layer than the passivation layer and the antistatic layer.

16. The touch sensor panel of claim 15, wherein the one or more overcoat layers include a first overcoat layer on a first side of the sliver nanowire layer and a second overcoat layer on a second side of the silver nanowire layer opposite the first side of the silver nanowire layer.

17. The touch sensor panel of claim 15, further comprising:
   an anticorrosion film disposed on at least one of the one or more overcoat layers and contacting a third side of the silver nanowire layer perpendicular to the first side and the second side of the silver nanowire layer and contacting the substrate.

18. The touch sensor panel of claim 17, further comprising:
   a second passivation layer disposed on the anticorrosion film, wherein the multi-layer protective film is disposed on the second passivation layer.

19. The touch sensor panel of claim 6, wherein the electrochemically stable outer shells comprise nickel, palladium or platinum.

20. The touch sensor panel of claim 1, wherein the antistatic layer comprises polystyrene sulfonate.

* * * * *